United States Patent [19]

Norris et al.

[11] 4,193,580
[45] Mar. 18, 1980

[54] PLUG VALVE

[75] Inventors: Lewis H. Norris, Brighton; Charles H. Dykes, Lindfield, both of England

[73] Assignee: Worchester Controls AG, Zug, Switzerland

[21] Appl. No.: 783,899

[22] Filed: Apr. 1, 1977

[30] Foreign Application Priority Data

Apr. 6, 1976 [GB] United Kingdom ............. 13847/76

[51] Int. Cl.² .............................................. F16K 5/00
[52] U.S. Cl. .................................. 251/309; 251/304; 251/315; 251/317
[58] Field of Search ............. 251/309, 315, 304, 317

[56] References Cited

U.S. PATENT DOCUMENTS

| Re. 24,102 | 12/1955 | Ohls | 251/172 |
|---|---|---|---|
| 369,613 | 9/1887 | Powell | 251/309 |
| 477,605 | 6/1892 | Pratt | 251/316 |
| 1,299,428 | 4/1919 | Cheeks | 251/309 |
| 1,451,588 | 4/1923 | Reidt | 251/312 |
| 2,297,161 | 9/1942 | Newton | 251/315 |
| 2,505,270 | 4/1950 | Allen | 251/175 |
| 2,708,096 | 5/1955 | Mueller | 251/309 |
| 2,898,081 | 8/1959 | Johnson | 251/309 |
| 3,133,723 | 5/1964 | Goldman et al. | 251/309 |
| 3,593,960 | 7/1971 | Scaramucci | 251/315 |
| 3,700,210 | 10/1972 | Manoogian | 251/304 |
| 3,722,856 | 3/1973 | Koch et al. | 251/315 |
| 3,985,152 | 10/1976 | Albanese | 251/309 |

FOREIGN PATENT DOCUMENTS

| 918134 | 1/1973 | Canada | 251/315 |
|---|---|---|---|
| 515711 | 2/1955 | Italy | 251/309 |
| 991111 | 5/1965 | United Kingdom . | |
| 1390159 | 4/1975 | United Kingdom . | |

*Primary Examiner*—William R. Cline
*Assistant Examiner*—H. Jay Spiegel
*Attorney, Agent, or Firm*—Pollock, VandeSande and Priddy

[57] ABSTRACT

A valve, of the type employing a plug rotatable through substantially 90° between open and closed valve positions, employs a plug which has an elongated configuration along its axis of rotation with the opposing ends of said elongated plug each exhibiting a spherical, ellipsoidal, or other curved configuration that merges smoothly into the elongated sides of the plug. The plug is provided with a passageway which is elongated in the direction of elongation of the plug and which extends through the plug in a direction transverse to the axis of rotation of the plug. The plug surface is sealed relative to the valve housing by at least one continuous seat of elongated closed loop configuration which engages the surface of the plug along a continuous noncircular line or band having a direction of elongation extending generally in the same direction as the central axis of the plug. The valving and sealing functions of the improved valve are similar to those of a conventional spherical ball valve, but achieve a given port area by use of a plug having a smaller cross section relative to the turning axis, than would be required of a ball exhibiting that port area.

53 Claims, 36 Drawing Figures

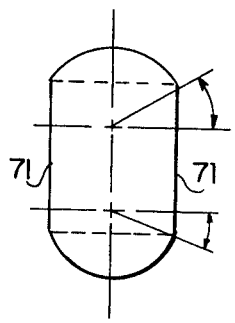
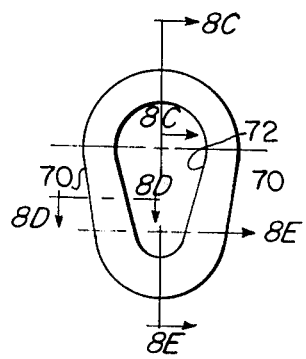
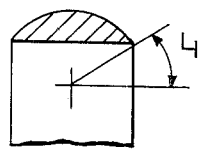
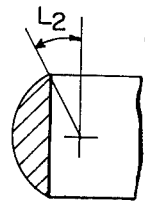
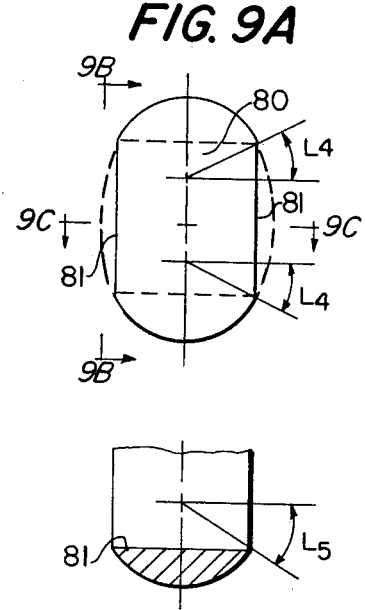
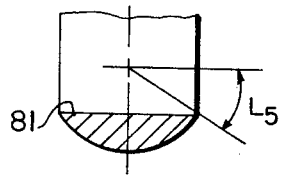
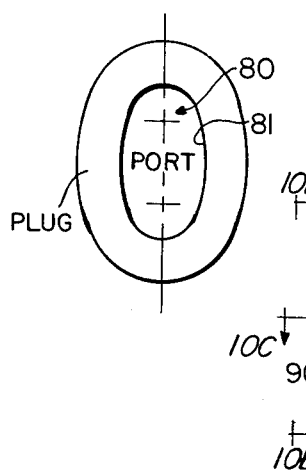
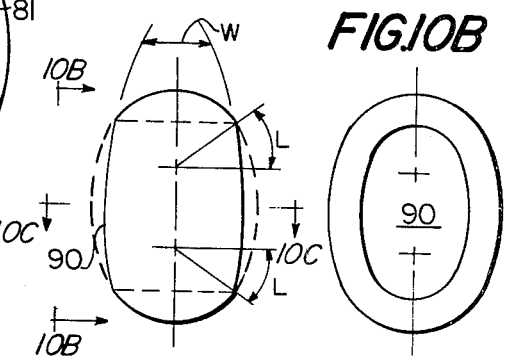
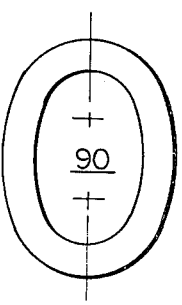
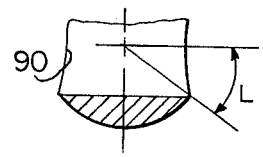

PLUG VALVE

BACKGROUND OF THE INVENTION

Broadly speaking, valves can be divided into two general types. There are those in which the orifice or port is embodied in a pipe or casing, and the port is opened or closed by insertion of, or removal of, or change in disposition of, a movable closure member. Such valves include gate, globe, butterfly, check, diaphragm, and needle valves, as well as others known to those skilled in the art.

A second broad family of valves is characterized by the provision of a movable member provided with a port so arranged that, by varying the disposition of said member usually about its central axis, e.g., by rotating a plug through substantially 90°, the valve may be opened or closed to the flow of fluids therethrough. Such valves are usually denominated tapered plug valves, parallel plug valves, spherical plug (or ball) valves, and disc valves, and are typified by arrangements of the type shown for example in Newton U.S. Pat. No. 2,297,161, Pratt U.S. Pat. No. 477,605, and Ohls U.S. Pat. No. Re. 24,102. This second family of valves normally includes, moreover, certain specialized valves wherein the moving member cooperates with a portion of the adjacent casing or pipe to define the port through which fluids pass in the open position of the valve, e.g., arrangements of the type shown in Reidt U.S. Pat. No. 1,451,588, and include other specialized valve configurations of the types shown for example in British Pat. No. 1,390,159 and No. 991,111 as well as conventional spool valves of the type employed in hydraulic and pneumatic applications.

The present invention is concerned with improvements in this second family of valves.

Conventional plug valves of types other than the spherical plug (or ball) valve, normally involve an elongated plug configuration which may exhibit an elongated flow passageway therethrough (as in Allen U.S. Pat. No. 2,505,270) or a passageway of substantially circular cross section extending through a tapered plug (as in the aforementioned Pratt patent) or through a parallel plug (as in the aforementioned Ohls patent). Plug valves of these general types have a number of recognized disadvantages, however, resulting in large part from the fact that comparatively complex sealing arrangements must be provided between the plug and valve housing to avoid leakage through the valve when the plug is in its closed position, and these sealing arrangements, in addition to their cost, complexity, and comparative unreliability, tend to increase the torque required to move the plug between its open and closed positions. Even though a plug of parallel or tapered configuration is easier and less expensive to manufacture than one of spherical configuration, therefore, spherical (or ball) plug valves have found increasing favor in recent years due to the fact that such spherical plug valves can be more reliably sealed by far simpler sealing arrangements consisting of unitary closed loop seals which engage the surface of the ball along a line or band of limited discrete width disposed in a comparatively simple geometry, e.g., in a single flat plane.

An outstanding advantage of spherical plug valves is that sealing arrangements can be used which are far more simple and effective than those which must be used with a parallel or taper plug valve. More particularly, the plug can be both supported and sealed by means of annular unitary seating members surrounding the respective ports in the casing and engaging the plug surface along respective sealing contours. Each seating member can be disposed in a single flat plane extending parallel with the axis of rotation, retained in the housing for example by location in a shouldered annular recess surrounding the corresponding port. Thus, the seat members, being of simple geometry and uniform radial section, are inexpensive to manufacture and easily replaceable in the valve assembly. Moreover, since the surface of the plug is engaged by the valve body only along the relatively narrow lines or bands of the sealing contours, friction is substantially reduced relative to that in a taper or parallel plug valve, and no further frictionreducing means, such as lubrication systems, are required.

A further advantageous feature of spherical plug valves is that the normals to the surface of the plug member at all points on the sealing contour are inclined at the same angle to the plane of the sealing contour. This leads to the result that, under service pressure, the loading or sealing force between the sealing member and the plug surface is substantially constant at all points around the sealing contour, and this condition of uniform loading is maintained even if the plug member is displaced downstream under the service pressure. Indeed, such displacement is intended to occur in certain types of valves, known as "floating plug" valves to improve the sealing efficiency. Accordingly, pre-loading of the seal member can be small thereby reducing the torque required to rotate the plug member, and reliable sealing can be obtained readily under all service pressure conditions.

While the art has been fully appreciative of the advantages which result from the foregoing sealing considerations in respect to spherical plug valves, e.g., lesser torque requirements, decreased cost of the seals, more reliable sealing, ease of seat replacement, etc., spherical ball valves have suffered from a fundamental disadvantage which the art has merely tolerated. More particularly, the size of the port or through-flow passageway in a ball valve is limited by the requirement that a sufficient surface area must be left in surrounding relation to the port for engagement by the seat, and if the subtending angle between the center of the ball and the lip of the port is as large as 45° or greater, no surface area would be available for engagement by the seat. The subtending angle is therefore normally determined as a compromise between the desire for the largest port area possible for a given size of ball and the provision of adequate sealing surface on the exterior of the ball; and the recognized optimum subtending angle for most ball valves is conventionally 37° although, in some cases, it has been increased to as much as 41°. Any reduction in the subtending angle below substantially 37° deoptimizes the port area for a given size of ball or plug, whereas any appreciable increase in the subtending angle above 37° imposes the serious risk that the seat will be engaged and torn by the port lip as the ball is displaced between its open and closed positions.

The practical effect of the foregoing considerations is that as the required port size increases in a spherical ball valve, the diameter of the ball also necessarily increases. This in turn increases the torque requirements on the ball, since torque is proportional to the average radial distance between the axis of rotation of the ball and the location of the sealing surface in contact with the exterior of the ball, and imposes the further disadvantages that, as required port (and therefore ball) size increases, the cost of the ball itself increases due to the increased amount of material which must be employed therein, and the space required for installation of the valve also increases.

The present invention is intended to obviate the foregoing problems by the provision of plug shapes which, to a greater or lesser degree, can make use of all conventional ball valve technology including the aforementioned sealing considerations and advantages of ball valves, but which, in comparison with conventional ball valves, are capable of providing a relatively larger port area for a given horizontal or axial cross sectional diameter of the plug, require the utilization of less material in the manufacture of the plug member, provide a valve which is considerably more compact than a conventional ball valve of equivalent port area, and, for a given port area, reduce the torque required for operation of the valve.

SUMMARY OF THE INVENTION

In accordance with the present invention, the plug to be employed in a valve of the second family of valves previously discussed is fabricated to exhibit an elongated configuration extending along a central axis transverse to the fluid flow path through the associated valve. Every section of the plug orthogonal to its central axis of rotation is essentially circular, and the external shape of the elongated plug is such that it is generated by rotation of a line, extending generally in the direction of extension of the plug central axis and spaced from said central axis, about the central axis, the line of generation having convexly curved line segments at its opposing ends which direct the opposing ends of the line of generation in a smoothly curved configuration toward the central axis, said convexly curved line segments being interconnected to one another along the line of generation by an intervening line segment of such configuration that the entire line of generation, constituting said convexly curved line segments and said intervening line segment, is noncircular.

The aforementioned intervening line segment of the line of generation can be disposed parallel to the central axis of the plug, and the convexly curved line segments at the opposing ends of the plug can be circular arcs having like radii equal to the spacing between the plug central axis and the intervening line segment of the line of generation, whereby the overall plug is of spherical parallel configuration comprising a pair of opposing semispherical ends which merge smoothly into an intervening cylindrical plug section. Alternatively, the intervening line segment of the line of generation can be inclined relative to the plug central axis, and the convexly curved line segments at the opposing ends of the line of generation can be circular arcs of differing radii which merge smoothly into opposing ends of the inclined intervening line segment, whereby the overall plug has a spherical tapered configuration characterized by opposing semispherical ends of differing radii which merge smoothly into an intervening truncated conical section of the plug. Still other configurations can be employed, however, e.g., arrangements wherein the convexly curved line segments at the opposing ends of the line of generation and/or the intervening line segment of that line of generation are of elliptical or other curved configurations which merge smoothly into one another to provide a plug which is entirely or partially ellipsoidal in shape or which exhibits any other desired regular or irregular external surface configuration.

The plug is provided with a flow passageway of elongated cross section extending through the body of the plug in a direction transverse to the direction of elongation of the plug, said passageway being completely bounded by the material of the plug, or being formed in a side of the plug in those valves where the plug is intended to cooperate with a portion of the adjacent casing or pipe to define the port through which fluids pass in the open position of the valve. The elongated cross section of said fluid flow passageway can have opposing ends of semicircular shape exhibiting radii that are either the same as or different from one another with said circular ends being separated from one another by intervening straight passageway sides which are parallel to or tapered relative to one another, or the opposing ends and intervening sides of the elongated passageway cross section can be provided with still other shapes, e.g., elliptical arcs. The cross sectional shape of the passageway, in planes transverse to the direction of extension of the passageway through the plug, can be similar to or, in the alternate, different from, the external shape of the plug itself in such planes, but in either case the opposing ends and sides of the passageway cross section merge smoothly into one another in a manner which avoids dramatic changes in direction, to permit the plug to be associated with a seat or seal similar to that employed in conventional ball valves.

In this latter regard, the plug cooperates with at least one continuous seat of elongated closed loop configuration, disposed adjacent at least one side of the plug, to provide a fluid seal between the valve casing and an external surface portion of the plug located between the opposing ends of the passageway when the plug is in its closed position. The direction of elongation of the closed-loop seat configuration is parallel to the central axis of the plug, and the seat engages the surface of the plug along a continuous noncircular line or band of discrete width which is defined by curved sections at its opposing ends with these curved end sections merging smoothly into intervening line or band sections having shapes different from those of the end sections.

In the preferred form of the invention, the plug configuration is of the spherical parallel type discussed above so that all radial sections through the sealing surface on the exterior of the plug are constant and, for a constant cross section of seal material, provide parallel seating faces on opposite sides of the plug with each such seating face lying in a single flat plane. Such a configuration is extremely simple to make and is more easily sealed. However the other plug contours referred to earlier also provide an advantageous seal contour in that all radial cross sections to the port lip are such that similar seal sections may be used throughout, varying only in dimension from one seal section to another, with no abrupt change of sealing section being required, and with the sealing surface and seat support surface in the valve body each lying on a flat plane or on a simple geometric plane.

The improved valve contemplated by the present invention can embrace all the well known design features of existing ball valves, such as downstream sealing or upstream sealing or both, a trunnion mounting for the plug or, in the alternative, a floating plug arrangement, three-piece valve construction, two-piece valve construction, a top entry arrangement, the use of various types of seats such as re-enforced seats, spring-loaded seats, etc. In short, the new plug shapes contemplated by the present invention are capable of utilizing all ball valve technology.

BRIEF DESCRIPTION OF THE DRAWINGS

The foregoing objects, advantages, construction and operation of the present invention will become more readily apparent from the following description and accompanying drawings in which:

FIGS. 8A-8E depict another embodiment of the present invention;

FIGS. 9A-9C depict a still further embodiment of the present invention; and

FIGS. 10A-10C depict still another embodiment of the present invention.

DESCRIPTION OF THE PREFERRED EMBODIMENTS

To facilitate an understanding of the plug configurations contemplated by the present invention, and the manners in which they differ from plug configurations suggested heretofore, FIGS. 1-3 depict the generation and configuration of three typical prior art valve members commonly employed heretofore in plug valves, and FIG. 4 et seq then depict a variety of plug configurations which embody the improvements of the present invention. In each case, the exterior shape of the valve member will be described by reference to the geometric principles and, more particularly, the line of generation, used to form the plug shape in question, and this same reference to line of generation will be employed in the appended claims since this constitutes a convenient and specific manner by which the plug shapes of the present invention can be defined and distinguished from prior art plug shapes.

Figure 1A:
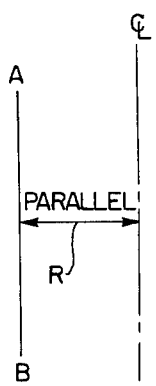
FIGS. 1A, 1B, and 1C illustrate the generation of, and configuration of, a known prior art valve member of the parallel plug type.
Figure 1B:
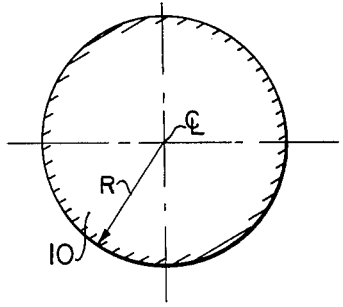
Figure 1C:
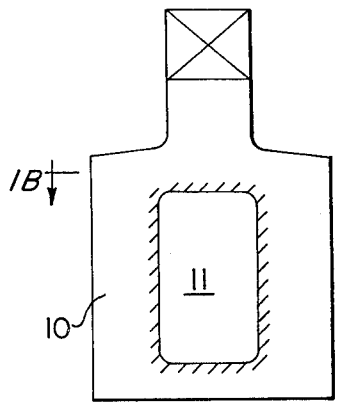

FIGS. 1A-1C illustrate the generation and configuration of a known prior art valve member of the so-called parallel plug type. The sealing surface on the exterior of the plug (which is depicted in shaded configuration in FIGS. 1B and 1C) is determined by a straight line of generation A-B which is parallel to a central axis and displaced therefrom by a distance R, and which is rotated about the central axis to produce a plug configuration in which all horizontal sections are true circles of radius R (see FIG. 1B). The plug is of generally cylindrical configuration throughout (see FIG. 1C) and can be provided with a flow passageway 11 extending therethrough which may be of elongated configuration as shown in FIG. 1C, or of circular cross section as in the aforementioned Ohls patent. When the passageway is of elongated configuration, it is customary for all sides of the passageway to be generally linear so that the overall cross sectional shape is generally rectangular as illustrated. In any event, since the portions of the sealing surface extending across the top and bottom edges of the passageway are each circular arcs (as shown in FIG. 1B) whereas the portions of the sealing surface extending along the vertical edges of the passageway are essentially straight lines or bands (as shown in FIG. 1C), the sealing surface contour varies substantially from one location to another about the edge or lip of port 11, requiring a corresponding major variation in shape for different radial sections of a seal adapted for use with a plug of the type shown in FIG. 1C. Such seal shape variations at different radial sections thereof are depicted, for example, in the aforementioned patents to Ohls, Allen, and Pratt.

Figure 2A:
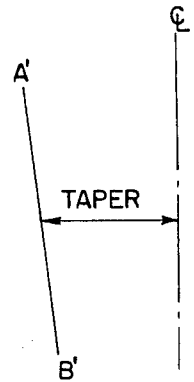
FIGS. 2A, 2B and 2C depict the generation of and configuration of a known prior art valve member of the tapered plug type.
Figure 2B:
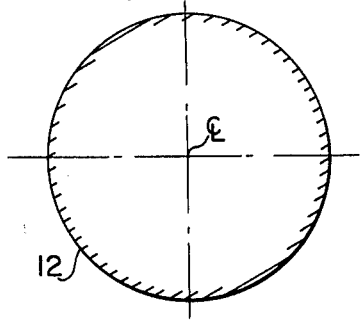
Figure 2C:
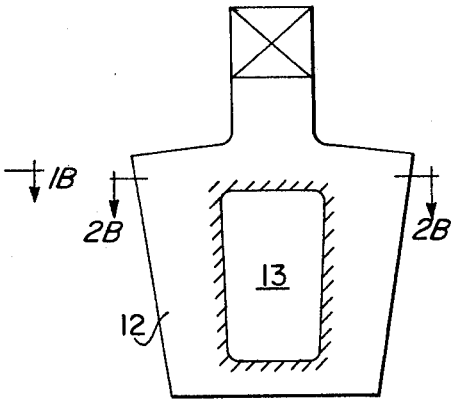

FIGS. 2A-2C are generally similar to FIGS. 1A-1C except that the straight line of generation A'-B' is disposed in nonparallel relation to the center line of the plug so that, when said line of generation is rotated about said central axis, the resultant plug configuration is of truncated conical shape (see FIG. 2C) every horizontal section of which is a true circle, but with different horizontal sections having different radii. The resultant plug 12 is commonly termed a taper plug, can be provided with a port 13 having one of the configurations described with reference to FIG. 1C or, as illustrated, a cross-sectional shape which is elongated and tapered in the direction of elongation of the plug itself. The sealing surface configurations which arise in a taper plug arrangement of the type shown in FIGS. 2A-2C are generally similar to those already described in reference to the parallel plug arrangement of FIG. 1.

Figure 3A:
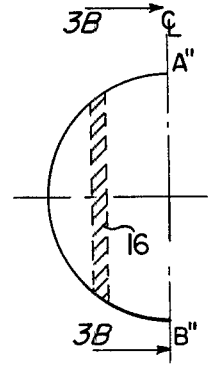
FIGS. 3A and 3B depict the generation of and configuration of a known prior art valve member of the spherical plug, or ball valve, type.
Figure 3B:
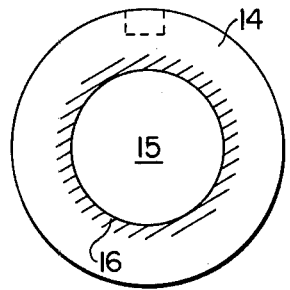

For the reasons already discussed, the plug arrangements of FIGS. 1 and 2 exhibit various sealing and torque problems which are overcome by the third conventional form of prior art plug valve, i.e., the spherical plug or ball valve depicted in FIGS. 3A and 3B. This latter form of valve member is formed by rotating a semi-circular line of generation A"-B" about the center line to form a spherical member 14, and a flow passageway 15 of circular cross section is provided through the ball in a direction transverse to its central axis. The sealing surface in such an arrangement is a circular line or band 16 of discrete width (FIG. 3B) which lies in a flat plane (FIG. 3A) so that all radial sections through the sealing surface are constant thereby permitting the use of a substantially constant cross section of seal material.

Notwithstanding the foregoing sealing advantages of ball valves, such valves suffer from the disadvantage previously discussed that the size of the port 15 is limited by the requirement that a sufficient surface area be left in surrounding relation to the port for contact with the seat adequately for sealing and without imposing a risk that the seat will be engaged and torn by the port lip as the ball is displaced between its open and closed positions. As a result, there is a definite limitation on the largest port area which can be provided in a given size of ball, with the result that a required increase in port area necessitates an increase in the ball diameter, and consequent increases in the torque requirements and valve dimensions. The present invention, by providing plugs having different shapes from those conventionally employed heretofore, permits the various advantages of ball valves to be realized without the port size limitation which has characterized conventional ball valves heretofore and, as a result, achieves an improved plug valve which, for a given port area, utilizes less material in the plug member itself, exhibits a smaller horizontal or axial cross sectional diameter, and is capable of being turned through 90° with a smaller torque, than a conventional ball valve having that same port area, while at the same time retaining all of the well known sealing advantages of a conventional ball valve.

Figure 4A:
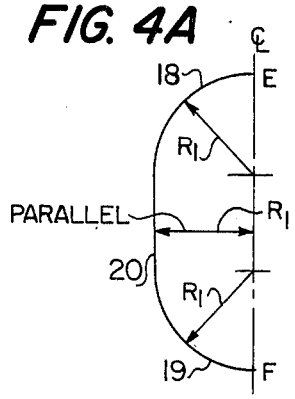
FIGS. 4A, 4B, 4C and 4D depict the generation and configuration of an improved valve member constructed in accordance with the present invention and of the spherical parallel type.
Figure 4B:
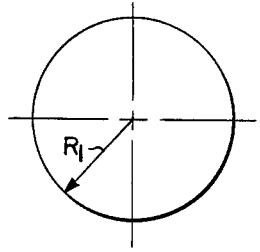

FIGS. 4A–4D illustrate the generation and configuration of an improved plug member constructed in accordance with the present invention and of the spherical parallel type. In contrast to the arrangement previously described with reference to FIGS. 1A–1C, the line of generation EF which defines the shape of the valve member embodiment shown in FIGS. 4A–4D includes a pair of line segments 18 and 19 at its opposing ends, each of which is a circular arc, and an intervening line segment 20 which interconnects arcuate segments 18 and 19. Straight line segment 20 is parallel to the central axis of the plug and is spaced therefrom by a distance $R_1$ which is the same as the radius $R_1$ of each of the circular arcs 18 and 19. As a result, when the overall line of generation E-F is rotated about the center line, the plug shape which is generated exhibits horizontal sections which are true circles as shown in FIG. 4B, and the plug itself exhibits opposing hemispherical ends 21, 22 which are spaced from one another by an intervening cylindrical section 23, with all of the plug sections 21, 22, 23 having the same radius $R_1$.

The plug of FIG. 4 is provided with a flow passageway 24 extending therethrough in a direction transverse to the central axis of the plug and adapted, by rotating the plug through 90°, to be disposed in an open position wherein the passageway is disposed along a flow path between inlet and outlet openings in an associated valve housing, or a closed position in which the passageway 24 is positioned transverse to said flow path. As best shown in FIG. 4C, the cross sectional shape of the passageway 24, in planes transverse to the direction of extension of said passageway through the plug, is elongated in the direction of elongation of the plug, and said cross sectional passageway shape includes semicircular opposed ends each of which exhibits a radius $R_2$ and an intervening straightsided port section having a width $2R_2$. These particular dimensional relationship, embodied in the plug member of FIG. 4, represent the preferred embodiment of the inventions since they provide identical characteristics to a conventional ball valve, i.e., all radial sections through the sealing surface are constant and, for a constant cross section of seal material, provide parallel seating faces with the result that the improved valve member is not only extremely simple to make, but is far more easily sealed than conventional parallel plug valves of the type shown in FIG. 1.

Figure 4C:
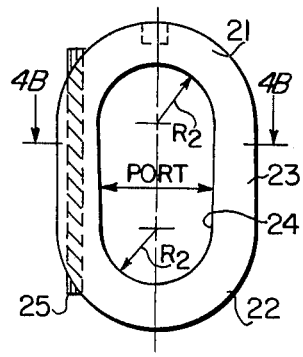
Figure 4D:
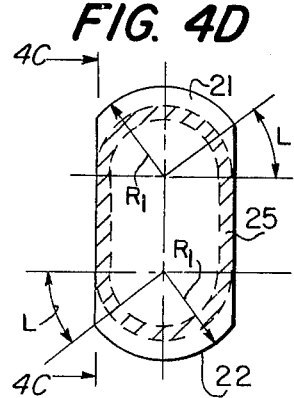

More particularly, by reason of the foregoing dimensional considerations, the port defined at opposing ends of passageway 24 is subtended by the optimum angle L (see FIG. 4D) at all radial sections through the port lips thereby to provide a maximum port area for a given plug size, and the most economic usage of material for the plug member itself. The seal 25 which may be associated with such an arrangement can comprise a single continuous resilient seat of elongated closed loop configuration with the direction of elongation of said closed loop being parallel to the central axis of the plug, and such a seat can be shaped and dimensioned to engage the exterior surface portion of the plug along a continuous noncircular band of discrete width shaped to define curved sections at the opposing ends of said band which merge smoothly into intervening band sections having shapes different from those of the curved end sections of the band (see FIG. 4D) with said band lying in a single flat plane (as depicted in FIG. 4C). It will be appreciated that each of FIGS. 4C and 4D depict the relationship between the seal and plug when the plug is in its closed configuration, and that an analogous such relationship would be achieved when the plug is turned through 90° relative to the associated seal member to place the valve in its open position. It will further be appreciated that the hemispherical ends of the plug may be truncated, if desired, above and below the sealing area without affecting the sealing relationship.

FIGS. 5A–5D depict a complete valve member which embodies a plug of the type discussed above with reference to FIG. 4. It must be understood, however, that the particular embodiment shown in FIG. 5 illustrative only, and that various other valve body, seal, and stem arrangements already known in the ball valve field can be utilized in place of the specific structural configuration which is actually illustrated.

The overall valve comprises, in the form illustrated, a valve body 30 and an associated body connector 31 which are adapted to be connected to one another by fasteners 32, e.g., bolts, extending through mating flanges in the body elements 30, 31. The resultant casing is shaped on its interior to define a valve chamber 33 which is comparatively elongated in vertical planes (see FIG. 5A and 5B) and comparatively narrow in horizontal planes (FIG. 5D) wherefore the overall shape of the interior valve chamber is generally similar to, but dimensionally somewhat larger than, the rotary plug 34. Plug 34 constitutes, in this particular form of the invention, a spherical parallel plug of the type already described in reference to FIG. 4, and it is disposed in floating relation to the elements 30, 31 within valve chamber 33 between a pair of seat seals 35, 36 which are supported adjacent the upstream and downstream openings of the valve chamber 33 within shouldered recesses provided in housing elements 30, 31 respectively.

The seals 35, 36 may take any form well known per se in the ball valve field and, in general, are of closed loop configuration and have sealing faces which engage both the housing elements and plug surface, preferably with an appropriate pre-load to maintain such sealing engagement as the plug is displaced in upstream and downstream directions, in accordance with well known ball valve technology. In contrast to conventional ball valve arrangements, however, wherein each seat or seal is circular, the seat-seals 35, 36 are formed as closed loops that are elongated in a direction parallel to the axis of rotation of plug 34, being either formed in such an elongated configuration originally or being confined into such an elongated configuration by the support surfaces of the housing elements. By reason of the considerations already described, all radial seat sections are constant in shape in this particular form of the invention.

Body elements 30, 31 include ends 37 for connecting the valve into an appropriate pipeline, said ends being of any well known type, e.g., of the flanged, screwed, butt, or socket weld type. The outermost end of each body element includes a generally circular opening 38 adapted to mate with the associated pipeline sections, with each opening 38 having a diameter which corresponds generally to the vertical dimension of the elongated port and through flow passage 39 of plug 34. Said circular openings 38 communicate with interior flow passageways 40 which are tapered in a horizontal plane (see FIG. 5D) to a width substantially equal to the horizontal dimension of the port 39 in plug 34, to provide body throat ports 41 which are similar in shape and dimension to the ports 39 of the plug.

Fluid flow through the valve is controlled by selectively rotating plug 34 about its vertical axis between an open position (illustrated in the drawings) wherein the flow passageway through plug 34 is in alignment with the body flow passageways 40, and a closed position in which the plug passageway is disposed transverse to the flow path through said passageways 40. This rotation of the plug about its vertical axis is effected by an appropriate operator coupled to a valve stem 42 which is mounted for rotation within the valve bonnet in sealed relation thereto by virtue of a gland packing 42a, a gland 43, and a gland nut 44, said stem 42 including an integral drive tang 45 which is inserted into a corresponding recess 46 in the upper spherical end of plug 39. It must be understood, however, that other operator arrangements can be employed, e.g., well known arrangements of the type wherein the axis of rotation of the valve member is differently located in the open and closed positions respectively of said valve member, with the operator being adapted to provide a camming action which displaces the axis of rotation in the flow direction through the valve simultaneously or in conjunction with rotation of the valve member between its open and closed positions.

The particular form of plug shown in FIGS. 4 and 5 is characterized by opposing spherical ends of like radius and a straight-sided intervening cylindrical portion having a diameter equal to the diameter of the plug ends, and is further characterized by the provision of a flow passageway through the plug which, in vertical section, has a shape similar to that of a vertical section through the plug, as well as by a sealing contour on the surface of the plug which has a shape similar to the outline of the plug port. It must be understood, however, that the sealing contour need not necessarily have the same shape as the port, nor does the port shape have to be similar to that of the plug, nor does the plug form have to be of the preferred spherical parallel type already described. The opposing spherical ends of the plug, for example, can have differing radii rather than the same radii; the opposing ends need not be spherical, but may take other curved forms such as ellipsoidal shapes; the circular ends in the elongated port may have differing radii rather than the same radii; the sides of the plug between its opposing ends can be curved rather than straight; the sides of the port between its opposing ends can also be curved rather than straight, etc. The only considerations which must be observed are that the plug be of elongated configuration, that every section of the plug orthogonal to its central axis be circular (and, even here, the radial dimension can vary slightly to provide a greater tightness of the plug in its closed or sealing position), that the external surface of the elongated plug be generated by rotation of a line about the central axis wherein the line of generation has convexly curved line segments at its opposing ends which direct the opposing ends of the line of generation in a smoothly curved configuration toward the central axis and wherein said convexly curved line segments are interconnected to one another along the line of generation by an intervening line segment of such configuration that the entire line of generation is noncircular, and that the cross-sectional shape of the flow passageway in the plug is elongated in the direction of elongation of the plug in planes transverse to the direction of extension of said passageway through the plug.

A number of alternative plug and port configurations meeting these general criteria will now be described with reference to FIGS. 6-10 inclusive, and still other variations will be apparent to those skilled in the art.

Figure 6A:
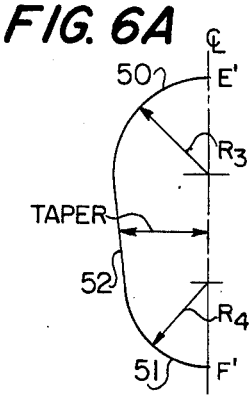
FIGS. 6A-6F depict the generation and configuration of an improved valve member constructed in accordance with the present invention and of the spherical taper type, with FIGS. 6D-6F constituting cross sections taken on lines 6D—6D, 6E—6E, and 6F—6F respectively.
Figure 6B:
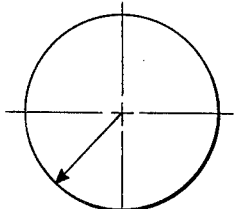
Figure 6C:
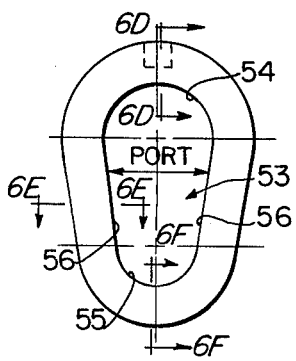

FIGS. 6A-6F illustrate the generation and configuration of a plug of the spherical taper type which complies with the foregoing criteria. The line of generation E' F' has a pair of curved line segments 50, 51 at its opposing ends which are circular arcs of differing radii $R_3$, $R_4$, respectively, and said circular arcs 50, 51 are interconnected to one another by a straight intervening line segment 52 which is inclined, rather than parallel to, the central axis about which the line of generation is rotated. The resultant plug exhibits horizontal sections which are true circles (FIG. 6B), and is characterized by a pair of opposing hemispherical ends of differing radii which merge smoothly into an intervening truncated conical plug section (FIG. 6C).

The port which is formed in the plug is, in vertical section, of similar shape, i.e., as shown in FIG. 6C, the port 53 has opposing semicircular ends 54, 55 of differing radii respectively, which merge smoothly into intervening flat tapered sides 56. Even though the plug and port configuration differ from those of the embodiment previously described with reference to FIG. 4, the optimum angle of subtension L is still present in the plug of FIG. 6, and is constant for all radial sections through the port lip (see FIGS. 6D-6F), but radial seat seal sections will vary due to the changing radii of the plug.

Figure 7A:
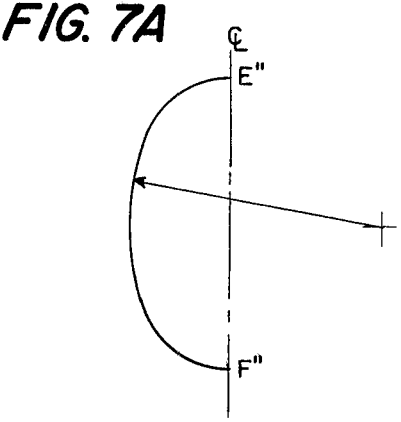
FIGS. 7A-7C depict the generation of and configuration of still another valve member constructed in accordance with the present invention.
Figure 7B:
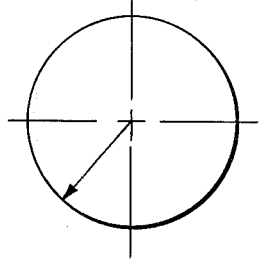
Figure 7C:
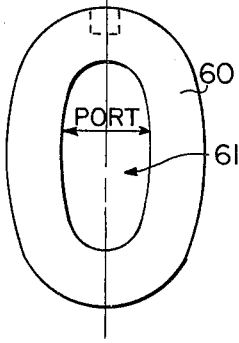
Figure 5A:
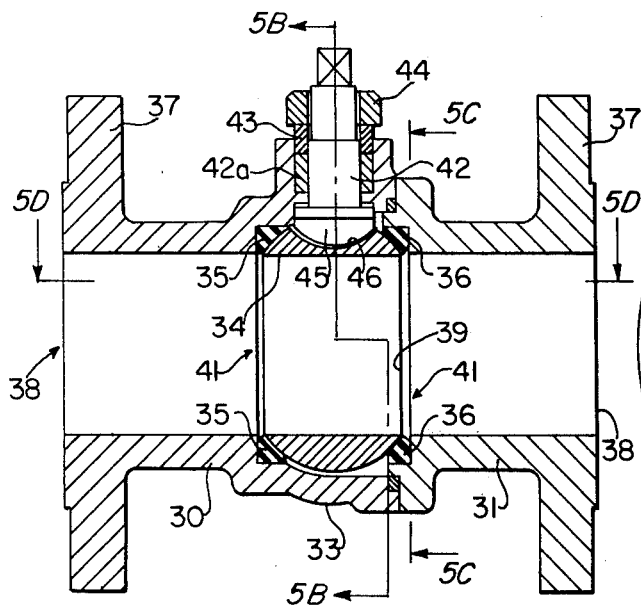
FIGS. 5A through 5D depict a plug valve constructed in accordance with the present invention and embodying a spherical parallel plug of the type shown in FIGS. 4A through 4D, with FIGS. 5B, 5C and 5D representing cross sections taken on lines 5B—5B, 5C—5C and 5D—5D respectively of FIG. 5A.
Figure 5B:
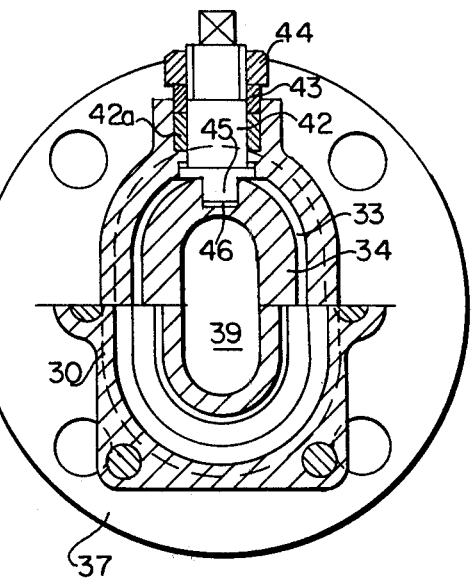
Figure 5D:
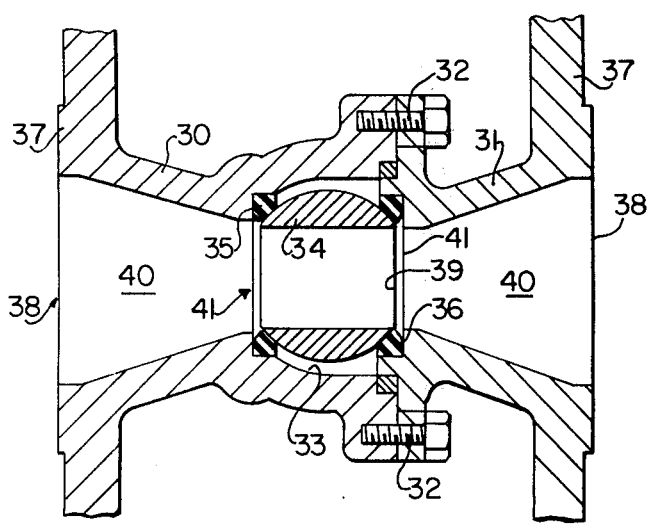
Figure 5C:
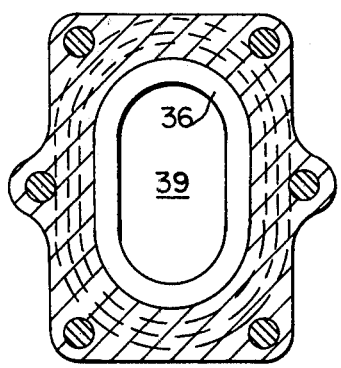

In the embodiment of FIG. 7, the line of generation E" F" is curved throughout its length at varying radii, or said line may be of elliptical shape, or of any other desired regular or irregular shape falling within the previously described criteria. When such a line of generation is rotated about the central axis of the plug, the resultant plug again has horizontal sections of circular configuration (FIG. 7B) and is of overall ellipsoidal or other uniformly curved elongated configuration as illustrated at 60 in FIG. 7C. The port 61 through the plug may have an elongated configuration which, in vertical section, is shaped similar to a vertical section of the plug itself.

Another plug configuration, constituting a modification of the spherical taper plug previously described with reference to FIG. 6, is illustrated in FIGS. 8A-8E. In the FIG. 6 embodiment (which may be advantageously employed, for example, in a top entry valve) the plug is uniformly tapered between its opposing ends to the inclination of the line segment 52 of the line of generation previously described. In the modified form shown in FIG. 8, however, the plus is tapered in planes transverse to the flow direction through the plug, as at 70 in FIG. 8B, but exhibits straight parallel sides 71 in planes parallel to the flow direction as shown in FIG. 8A. The port 72 through the plug is, as in the arrangement previously described with reference to FIG. 6C, defined by circular arcs of differing radii at its opposing ends interconnected to one another by intervening flat tapered sides; but as shown in FIG. 8B, the angle of taper between the sides of the flow passageway through the plug may differ from the angle of taper between the sides of the plug itself. It is to be understood that in this embodiment the plug body is tapered in all planes but the port lips are made parallel by varying the angle of subtention L as appropriate to achieve this. This provides parallel seat seal planes relative to the axis of the plug but of course to some extent de-optimizes the port area where L is below the "optimum" as previously described.

Figure 6D:
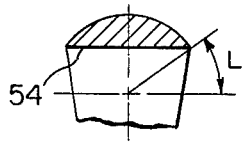
Figure 6E:
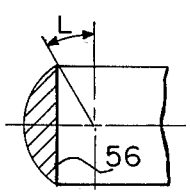
Figure 6F:
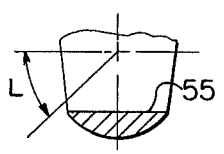

As shown in FIGS. 8C–8E, and in contrast to the arrangement described with reference to FIGS. 6D–6F, the angle of subtention varies from an angle $L_1$ is radial sections through the lip defined by the upper circular portion of the port (FIG. 8C) to a lesser angle of subtention $L_2$ along the sides of the port (FIG. 8D), to an even smaller angle of subtention $L_3$ at the lower circular section of the port (FIG. 8E). As a result of this consideration, and in contrast to the arrangement described with reference to FIG. 5, the cross-sectional configuration of the seat-seal which would be associated with a plug of the type shown in FIG. 8 will vary a little more than for the arrangement described with reference to FIGS. 6D–6F, but similar seat seal sections may nevertheless be used throughout with the variation being only in dimension and with no abrupt change of sealing section being required.

FIGS. 9 and 10 depict a still further plug type wherein, as in the other arrangements previously described, all horizontal sections through the plug are true circles about the central axis of generation, but wherein the line segment of the line of generation interconnecting its opposing convexly curved ends is irregular. In FIG. 9, the opposing ends of the flow passageway 80 are defined by port lips 81 which are parallel to one another (FIG. 9A) but wherein there is a varying angle subtending the port, i.e., an angle $L_4$ adjacent the upper and lower edges of the port, and an angle $L_5$ along the sides of the port. The overall plug configuration is curved throughout (see FIG. 9B) and may, for example, constitute an ellipsoid; and the port cross section (FIG. 9B) may be elliptical in shape.

In FIG. 10, wherein an irregular line of generation has again been employed to form the plug, the port 90 is formed with a constant port subtending angle L throughout with the result that the port lips, when viewed in side elevation (FIGS. 10A and 10C) are non-linear. The resulting sealing lines accordingly lie in comparatively simple geometric planes W (FIG. 10A) which are tapered vertically and which are nonflat in configuration.

With respect to the various plug designs which have been described, only one, i.e., the spherical parallel plug of FIGS. 4 and 5, provides characteristics identical to those of conventional ball valves in that all radial sections through the sealing surface are constant and, for a constant cross section of seal material, provide parallel seating faces. This aspect of the invention is very important in that it represents the feature which makes existing ball valves so simple to construct and so easy to seal and, for this reason, the preferred plug design is that described in reference to FIGS. 4 and 5. However, the other plug designs described herein also provide an advantageous seal contour in that all radial cross sections through the port lip are such that a similar seal section may be used throughout, varying only in dimension, with no abrupt change of sealing section being required, and the sealing surface and seat support surface of the valve body lies on a flat plane or a simple geometric plane. The new plug shapes all have, to a greater or lesser degree, the well known sealing advantages of ball valves but, when compared with a ball valve, provide a relatively larger port area for a given diameter of horizontal plug cross section, require less material to be used in the manufacture of the plug member, provide a valve which is considerably more compact, and for a given port area reduce the operating torque required since that torque is proportional to the average radius, from the plug axis of rotation, of the seal surface in contact with the plug. All these considerations provide substantial cost savings in the manufacture and use of the valve, particularly when it is required to operate the valve with an actuator.

The new valve can embrace all the well known design features of existing ball valves, as described previously. Moreover, the new plug shapes can be employed particularly well as a multi-port valve member since the plug member can be considerably smaller in diameter for a given port area and/or number of ports. The plug shown in FIG. 8, moreover, may provide advantages when used for control purposes.

One of the disadvantages of the new plug is that the parallel or near parallel portions of the seat associated with the elongated plug tend to have less stability of shape, and accordingly are less able to remain in proper position in the valve casing during the intermediate closing phases between fully opened and fully closed valve positions. The circular seal ring employed in conventional ball valves is more self supporting in this respect. In these circumstances, the near straight sections of the seat employed with the improved plugs of the present invention may require some form of slot retention, clamping device, etc., or the actual seat must embody within itself by molding or otherwise some form of reinforcement, to assure that the seat exhibits adequate stability during continued valve operation.

It should further be noted that, while reference has been made to the fact that the spherical taper plug described with reference to FIG. 6 finds particular application in top entry valves, the spherical parallel plug of FIG. 4 can also be used in such an arrangement. If a taper is desired on the body/seat surface in order to allow the plug seat assembly to drop down into position on assembly, this can be effected by thickening the seat ring towards the top while leaving the mating sealing surface with the plug constant through all radial sections.

While we have thus described preferred embodiments of the present invention, many variations will be apparent to those skilled in the art. It must therefore be understood that the foregoing description is intended to be illustrative only and not limitative of the present invention; and all such variations and modifications as are in accord with the principles described are meant to fall within the scope of the appended claims.

Having thus described our invention we claim:

1. In a plug valve of the type comprising a casing adapted to be connected to a pipe line and having a valve chamber and inlet and outlet openings for defining a fluid flow path through said chamber, a plug being mounted in said chamber and having a fluid flow passageway extending through said plug, said plug being rotatable in said chamber about an axis of rotation extending transverse to said fluid flow path and transverse to the direction of extension of said passageway for selectively moving said plug between an open position in which said passageway is disposed along said fluid flow path between said inlet and outlet openings and a closed position in which said passageway is disposed transverse to said flow path, seal means being provided adjacent at least one side of said plug for providing a fluid seal between said casing and an exterior surface portion of said plug located between the opposing ends of said passageway when said plug is in its said closed position, the improvement wherein said plug is of elongated configuration extending along a central axis transverse to said fluid flow path, said central axis being the axis of rotation of said plug, every section of said plug orthogonal to said central axis of said plug being substantially circular, the shape of said elongated plug being such that the exterior surface of said plug is generated by rotation of a line, extending generally in the direction of extension of said central axis and spaced from said central axis, about said central axis wherein said line of generation has convexly curved line segments at its opposing ends which direct the opposing ends of said line of generation in a smoothly curved configuration toward said central axis and wherein said convexly curved line segments are interconnected to one another along said line of generation by an intervening line segment of such configuration that the entire line of generation, constituting said convexly curved line segments and said intervening line segment, is noncircular and the overall length of said plug is greater than the sum of the radii of said convexly curved line segments, the cross-sectional shape of said passageway in planes transverse to the direction of extension of said passageway through said plug being elongated in the direction of elongation of said plug, said seal means being supported by said casing in surrounding relation to one of said openings, said seal means comprising a single continuous resilient seat of elongated closed loop configuration, the direction of elongation of said closed loop seat configuration extending generally in the same direction as the central axis of said plug, said seat being shaped and dimensioned to engage and conform to said exterior surface portion of said plug along a continuous noncircular band of discrete width shaped to define curved sections at the opposing ends of said band which extend over the end portions of the plug defined by said convexly curved line segments and merge smoothly into intervening band sections having shapes different from those of said curved end sections of said band.

2. The structure of claim 1 wherein the opposing ends of said elongated plug are each semispherical in configuration.

3. The structure of claim 2 wherein said semispherical plug ends have the same radii respectively.

4. The structure of claim 3 wherein said intervening line segment of said line of generation is a straight line extending substantially parallel to said central axis of said plug, whereby the section of said plug between its said opposing semispherical ends is cylindrical in configuration.

5. The structure of claim 1 wherein the opposing ends of the said elongated cross section of said passageway are of semicircular shape.

6. The structure of claim 5 wherein said semicircular ends of said passageway cross section have the same radius respectively and are interconnected to one another by intervening straight-sided passageway cross-sectional portions extending substantially parallel to the central axis of said plug.

7. The structure of claim 5 wherein the opposing ends of the elongated cross section of said passageway are of semicircular shape having different radii respectively, said semicircular ends being interconnected to one another by intervening straight-sided passageway cross-sectional portions which are angularly inclined toward one another.

8. The structure of claim 1 wherein the opposing ends of said elongated plug are each substantially semispherical in configuration, said substantially semispherical plug ends having different radii respectively, said intervening line segment of said line of generation being a straight line extending in nonparallel relation to said central axis of said plug whereby the section of said plug between its said opposing semispherical ends is of truncated conical configuration.

9. The structure of claim 1 wherein said passageway extends through said plug along a line extending through and at right angles to the central axis of said plug, the sides of said passageway between its opposing ends being completely bounded by the material of said plug.

10. The structure of claim 9 wherein the opposing ends of said elongated plug are each semispherical in configuration.

11. The structure of claim 10 wherein said semispherical plug ends have the same radii respectively.

12. The structure of claim 11 wherein said intervening line segment of said line of generation is a straight line extending substantially parallel to said central axis of said plug, whereby the section of said plug between its said opposing semispherical ends is cylindrical in configuration.

13. The structure of claim 9 wherein the opposing ends of the said elongated cross section of said passageway are of semicircular shape.

14. The structure of claim 13 wherein said semicircular ends of said passageway cross section have the same radius respectively and are interconnected to one another by intervening straight-sided passageway cross-sectional portions extending substantially parallel to the central axis of said plug.

15. The structure of claim 9 wherein the opposing ends of the elongated cross section of said passageway are of semicircular shape having different radii respectively, said semicircular ends being interconnected to one another by intervening straight-sided passageway cross-sectional portions which are angularly inclined toward one another.

16. The structure of claim 1 wherein said curved line segments at the opposing ends of said line of generation are elliptical segments whereby the opposing ends of said plug are shaped as sections of an ellipsoid.

17. The structure of claim 1 wherein said entire line of generation, constituting said convexly curved line segments and said intervening line segment, is elliptical whereby said plug is shaped as an ellipsoid.

18. The structure of claim 17 wherein said cross-sectional shape of said passageway is elliptical.

19. The structure of claim 1 wherein said band lies in a single flat plane.

20. The structure of claim 19 wherein said single flat plane extends parallel to the central axis of said plug.

21. The structure of claim 20 wherein the opposing ends of said elongated plug are semispherical in configuration and have the same radius respectively, said semispherical plug ends being spaced from one another by an intervening plug section of cylindrical configuration coaxial with the central axis of said plug.

22. The structure of claim 21 wherein the opposing ends of the said elongated cross section of said passageway are of semicircular shape.

23. The structure of claim 22 wherein said semicircular ends of said passageway cross section have the same radius respectively and are interconnected to one another by intervening straight-sided passageway cross-sectional portions extending substantially parallel to the central axis of said plug.

24. The structure of claim 1 wherein the opposing ends of said elongated plug are each substantially semispherical in configuration, said substantially semispherical plug ends having different radii respectively, said intervening line segment of said line of generation being a straight line extending in nonparallel relation to said central axis of said plug whereby the section of said plug between its said opposing substantially semispherical ends is of truncated conical configuration.

25. The structure of claim 24 wherein the opposing ends of the elongated cross section of said passageway are of semicircular shape having different radii respectively, said semicircular ends being interconnected to one another by intervening straight-sided passageway cross-sectional portions which are angularly inclined toward one another.

26. The structure of claim 25 wherein the angle between the straight-sided portions of said passageway is different from the angle between the sides of the truncated conical section of said plug.

27. The structure of claim 1 wherein the opposing ends of said elongated plug are each semispherical in configuration.

28. The structure of claim 27 wherein said semispherical plug ends have the same radii respectively.

29. The structure of claim 28 wherein said intervening line segment of said line of generation is a straight line extending substantially parallel to said central axis of said plug, whereby the section of said plug between its said opposing semispherical ends is cylindrical in configuration.

30. The structure of claim 1 wherein the opposing ends of the said elongated cross section of said passageway are of semicircular shape.

31. The structure of claim 30 wherein said semicircular ends of said passageway cross section have the same radius respectively and are interconnected to one another by intervening straight-sided passageway cross-sectional portions extending substantially parallel to the central axis of said plug.

32. The structure of claim 1 wherein the opposing ends of the elongated cross section of said passageway are of semicircular shape having different radii respectively, said semicircular ends being interconnected to one another by intervening straight-sided passageway cross-sectional portions which are angularly inclined toward one another.

33. The structure of claim 1 wherein the sealing contour defined by said noncircular band differs in shape from the cross-sectional shape of said passageway.

34. The structure of claim 1 wherein all radial sections through said seat have substantially the same shape.

35. The structure of claim 1 wherein the opposing ends of said plug are truncated at positions outward of the opposing ends of said band.

36. The structure of claim 1 wherein the opposing ends of said passageway define ports, the edges of said ports being subtended by a fixed angle from the central axis of said plug at all radial sections through said port edges.

37. The structure of claim 1 wherein the opposing ends of said passageway define ports, the edges of said ports being subtended by a first fixed angle relative to the central axis of said port at radial sections passing through the port edges at one end of said elongated passageway, and being subtended by a different second fixed angle relative to the central axis of said port at radial sections passing through the port edges at the other end of said elongated passageway.

38. A valve comprising a body having a flow passageway extending therethrough, a plug member in said body having a port therein, said plug member being rotatable about an axis transverse to said passageway between a position in which said port is aligned with said passageway and a position in which said plug member obturates said passageway, said plug member being of elongated configuration and having end portions which are solids formed by the revolution of curved lines about the axis of said plug member, said end portions being joined to one another by an intervening central portion of which all sections perpendicular to said axis are circles to form a plug the overall length of which is greater than the sum of the radii of curvature of said end portions, said port in said plug member having a cross section of elongated configuration defined by a curve at each end joined by intervening lines, and a pair of continuous sealing rings located in spaced relation to one another between the plug member and the body and respectively engaging the surface of said plug member along narrow closed-loop bands on the surface of said plug member extending both over said end portions and said intervening central portion, each of said sealing rings being of elongated closed-loop configuration lying essentially in a single flat plane transverse to said flow passageway and shaped to engage and conform to the exterior of said plug member.

39. The valve of claim 38 wherein said ends of said plug member are semispherical.

40. The valve of claim 39 in which the semispherical ends of the plug member are of equal radius.

41. The valve of claim 38 in which the circular sections of the central portion of the plug member are all of equal diameter.

42. The valve of claim 38 wherein the port in said plug member is subtended by a fixed angle from the central axis of said plug.

43. The valve of claim 38 wherein the port in said plug member is subtended by a varying angle from the central axis of said plug.

44. A plug valve comprising a valve body assembly including a casing formed with first and second ports, at least one closed-loop unitary seating member surrounding said first port, and an elongated plug member formed with a passageway and rotatable with its exterior surface in sliding and sealing engagement with said seating member about an axis of rotation extending transverse to said passageway between an open position in which said passageway communicates with said first and second ports and a closed position in which said plug member obturates at least said first port with a sealing portion of its said exterior surface in sealing engagement with said seating member, said seating member being shaped to engage and conform to the surface of said plug member along a closed-loop sealing contour, the surface of said plug member being defined by the revolution about said axis of rotation of a generatrix line formed by curved end segments joined together by an intervening segment and curving smoothly away from said intervening segment towards said axis of rotation with a curvature which is greater than any curvature of said intervening segment to form a plug the overall length of which is greater than the sum of the radii of curvature of said end segments, said closed-loop sealing contour being a narrow band lying essentially in a single plane on the surface of said plug member and overlying the portions of said plug member defined both by the curved end segments of said generatrix line and by the said intervening segment thereof.

45. The plug valve of claim 44 wherein said sealing contour lies on the intersection with a flat plane of the said surface defined by said generatrix line.

46. The plug valve of claim 44 wherein the normals to said sealing surface portion at all points on said sealing contour are inclined at substantially the same angle to the median plane of said sealing contour.

47. The plug valve of claim 45 wherein said flat plane of said sealing contour extends substantially parallel to said axis of rotation.

48. The plug valve of claim 44 wherein the shape of said sealing contour is elongate with the major dimension thereof extending generally parallel to said axis of rotation.

49. The plug valve of claim 44 wherein said end segments of said generatrix line are circular arcs.

50. The plug valve of claim 44 wherein said intervening segment of said generatrix line is a straight line.

51. The plug valve of claim 50 wherein said straight line extends parallel to said axis of rotation.

52. The plug valve of claim 44 wherein the whole of the exterior surface portion of said plug member which is slidingly engaged by said seating member upon rotation of said plug member lies in the said surface defined by said generatrix line, whereby all radial sections through the said exterior surface portion are circular.

53. The plug valve of claim 52 wherein said passageway is completely bounded by the material of said plug member so that the ends of said passageway form separate openings in said exterior surface portion of said plug member, one of said openings being closely surrounded by said seating member when said plug member is rotated to said open position.

* * * * *